United States Patent [19]

Schubert

[11] Patent Number: 4,731,206

[45] Date of Patent: Mar. 15, 1988

[54] PROCESS AND DEVICE FOR THE PRODUCTION OF SHAPED BODIES IN MOLDS

[75] Inventor: Arnulf Schubert, Radstadt, Austria

[73] Assignee: Naue & Naue Gesellschaft m.b.H. & Co., Mandling, Austria

[21] Appl. No.: 816,492

[22] Filed: Jan. 6, 1986

[30] Foreign Application Priority Data

Jan. 17, 1985 [AT] Austria .................................. 104/85

[51] Int. Cl.⁴ .............................................. H05B 1/00
[52] U.S. Cl. ................................ 264/25; 425/174.8 R; 249/78
[58] Field of Search .................. 425/174.4, 174.8, 116, 425/117; 249/78, 83; 264/26, 25, DIG. 46

[56] References Cited

U.S. PATENT DOCUMENTS 2,560,783  7/1951  Scott ...................................... 249/78
4,555,373 11/1985  Bloemkolk ............................ 264/25

FOREIGN PATENT DOCUMENTS 31687   8/1972  Japan .......................... 264/DIG. 46
14901   of 1906  United Kingdom ....... 264/DIG. 46
704796 12/1979  U.S.S.R. ...................... 425/174.8 R Primary Examiner—Bernard Nozick
Attorney, Agent, or Firm—Beveridge, DeGrandi & Weilacher

[57] ABSTRACT

The invention relates to a process and a device for the production of shaped bodies of plastic material, in particular polyurethane foam, in molds introduced into an inductor.

A process of this type comprises the improvement that for the production of shaped bodies of plastic material, in particular of polyurethane foam or of fibers, nonwoven fabrics or the like impregnated or wetted with synthetic resins, latex or the like, of the reactive starting materials introduced into the molds, a frequency of 1 to 30 kHz preferably 5 to 12 kHz, is adjusted and that molds are used in which the individual mold parts are mutually electrically insulated in order to prevent a current flow in the mold around the shaped body and that optionally reinforcements or coating pieces of a material optionally identical to the material of the mold are formed on or applied to the outsides of metallic mold walls for the distribution of the current flow.

14 Claims, 2 Drawing Figures

PROCESS AND DEVICE FOR THE PRODUCTION OF SHAPED BODIES IN MOLDS

BACKGROUND OF THE INVENTION

The invention relates to a process for the production of shaped bodies of plastic material or foamed material, in particular on the basis of polyurethane foam, and a process for the production and/or compacting and/or drying and/or thermoplastic melting of non-woven materials, piles, plastic material fibers, fibers, rubberized hair, rubberized coir, glass fibers or the like which are impregnated, sprayed, wetted and the like with, in particular, thermosetting synthetic resins, for instance polyurethane, latex and the like, with the plastic material or the reactive components or the materials used for the production of the shaped bodies being introduced into a mold and the mold being heated in an inductor during the reaction of the components and the shaping.

In the production of foamed material bodies, in particular those made of polyurethane foam, there are difficulties in the formation of the surface and the completion of the reaction of the components in the surface areas. According to a known process, the reactive components are placed in molds heated by steam or hot air in order to supply the required amounts of heat. This process, however, requires an elaborate apparatus and is inefficient, the heating takes comparatively long and is not optimally controllable.

It has become particularly evident in practice that molds of irregular surface configuration cannot be sufficiently uniformly and quickly heated by means of steam or the like.

It is known to use composite molds for vulcanizing; the frequencies applied there do not require mutual insulation of the individual mold parts, as an uneven heating of the solid and thick parts is not detrimental and the generated heat is to be supplied to the shaped bodies. A precise distribution of temperature over the surface of the shaped bodies is not necessary.

Composite molds consisting of mutually insulated mold parts directly connected to HF electrodes do not permit a precise adjustment of the temperature on the surface of a shaped body, as the penetration depth into the shaped body is too great. For this reason, the working principle does not allow a comparison of devices of this type to devices in which the shaped bodies are produced in an inductor effecting the heating indirectly via the mold walls.

SUMMARY OF THE INVENTION

In order to eliminate the disadvantages of the known processes, the process of the type initially mentioned comprises the improvement that for the production of shaped bodies made of plastic materials, in particular of polyurethane foam or of fibers, non-woven fabrics or the like impregnated or wetted with synthetic resins or latex, of the reactive starting materials introduced into the molds, a frequency of 1 to 30 kHz, preferably 5 to 12 kHz, is adjusted and molds are used in which the individual mold parts are mutually electrically insulated in order to prevent a current flow in the mold around the shaped body, optionally forming or applying reinforcements or coating pieces of a material optionally identical to the material of the mold on the outsides of metallic mold walls for the distribution of the current flow. It is possible to introduce irregularly formed shapes into the inductor surrounding the mold in which the thinly formed mold walls are heated inductively, with the amount of heat required for maintaining the reaction temperature in the surface zone and for obtaining the desired surface quality being supplied to the outer surface of the shaped body and/or an amount of heat sufficient for drying and/or completion of the reaction of its components being supplied to the shaped body. The process according to the invention permits a simple control of the heating of the molds and possibly of the shaped bodies. Losses of energy only occur in the form of no-load losses of the generator and no elaborate apparatus is necessary.

The mold parts of composite molds, preferably two-part molds with a bottom and a lid part, for instance in the form of a box, are preferably simultaneously mutually sealed and electrically insulated, for instance by means of epoxy resin, silicone rubber, silicone resin, sealing or insulating strips or the like, in order to prevent a current flow in the mold around the shaped body. For the control of the distribution of the lines of electric flux and the heat and the current flow, it is convenient to provide the mold walls with ribs, plates, reinforcements, beads or the like welded, riveted, sprayed on or the like. It is also possible to provide inserts of the same or of a different material as that of the mold for changing the local thermal conductivity and/or the electric conductivity and/or the permeability of the mold walls. For this purpose, it is possible to provide thickenings of the metallic mold walls, such as integral solid ribs. These additions, plates, thickenings, ribs and the like can be arranged on the mold walls extending transversely or longitudinally; their arrangement is so selected that the most uniform heating possible over the mold or the mold parts is achieved. Applied plates or ribs, for instance, can have a cross sectional thickness of several millimeters and a width of several centimeters. Additions of this type are particularly convenient in metallic mold walls. The mold walls are made e.g. of steel and are up to 5 mm, for instance 1, 2 or 3 mm, thick.

A device in particular for the carrying out of the process according to the invention with an inductor into which molds with foamed material components to be reacted, in particular polyurethane foam components and/or non-woven fabric-type components, piles, plastic material fibers, fibers, rubberized hair, rubberized coir or the like which are introduceable, in particular conveyed through in cycles or continuously, is characterized according to the invention in that for the production of shaped bodies of plastic material, in particular polyurethane foam or fibers, non-woven fabrics or the like impregnated or wetted with synthetic resins or latex or the like, of the reactive starting materials introduced into the molds, at a frequency of 1 to 30 kHz, preferably 5 to 12 kHz, the individual mold parts are mutually electrically insulated in order to prevent a current flow in the mold around the shaped body and reinforcements or coating pieces of the same or of a different material as the mold are optionally formed on or applied to the outsides of the metallic mold walls for the distribution of the current flow. The inductor can have a cuboid or tubular inner space into which at least one mold is introduceable; the individual parts of the mold are inductively heatable and optionally sealed and are mutually electrically insulated. The thin mold walls are inductively heated so as to supply heat to the outer layer of the shaped body to be formed.

The foam seal of the electric insulation does not have to be complete, as the molds usually have outlet openings for excess foam which is electrically insulating. Fibrous materials containing air which are compressible and do not expand do not require a sealing effect of the electric insulation.

It was found that the distance between the mold wall and the inductor winding exerts little influence on the heating rate and the degree of effect, so that complex molds can also be heated without difficulty.

Less energy is consumed as compared to hot air heating, as only the mold walls have to be heated. In a hot air furnace, all means which are moved in and out and required for closing have to be heated and cooled again due to the nature of the process. Compared to the hot air process, the hardening and reaction time of the plastic material components is reduced by about fifty percent due to the quick heating; shorter cycle periods and fewer molds are required for the same plant capacity. For steam-heated molds, the masses to be heated, cooled and moved are much larger and more energy is consumed as a result.

According to the invention, a high degree of efficiency is achieved because no medium for heat transfer is required and less energy is consumed in comparison to molds heated by steam as a heating medium, due to the fact that the weight of the induction-heated molds, as a result of their construction, is only half that of steam-heated molds at the most. This has the advantage that conveying and foaming installations can be laid out structurally lighter and thus less costly. The highest possible mold temperature to be achieved is essentially higher and easier to reach than those of the conventional processes, since induction heating permits temperatures of 150° C. and more without difficulty, in contrast to steam and hot air.

Finally, the process and the device according to the invention can be used for heating, drying, and reacting of all materials for which the heat supply via the thin mold wall is sufficient to effect the desired treatment.

If it is provided that the mold has ventilating openings, preferably in the bottom and lid of the mold, for ventilating shaped bodies consisting of fiber-containing or fibrous materials, air-permeable formations, for instance rubberized hair formations sprayed with latex, can be dried, reacted, vulcanized and the like by passing heated air through the shaped body. The process according to the invention has the advantage over conventional drying and treatment methods that heat can be supplied in spots where there is normally no heating if drying or heating in the air stream is provided.

It is preferred when essentially heating only the thin mold walls that the penetration depth of the electric or magnetic field into the inductively heatable mold walls or their inductively heatable layers only slightly exceed the wall thickness, preferably correspond to this thickness or be less than this thickness and optionally correspond to about one tenth to one half, in particular one fifth to one third, of the thickness of the mold walls or layers. If the mold walls are formed in layers, it may be convenient if the penetration depth of the field exceeds the thickness of the mold wall or is equal to it. It may also be of advantage if the penetration depth amounts to up to three quarters of the wall thickness; the penetration depth selected will also depend on the desired course of heating.

BRIEF DESCRIPTION OF THE DRAWINGS

These and other aspects of the present invention are more apparent from the following detailed description and claims, particularly when considered in conjunction with the accompanying drawings in which like parts bear like reference numerals. In the drawings:

DETAILED DESCRIPTION OF A PREFERRED EMBODIMENT OF THE INVENTION

Figures 1, 2:
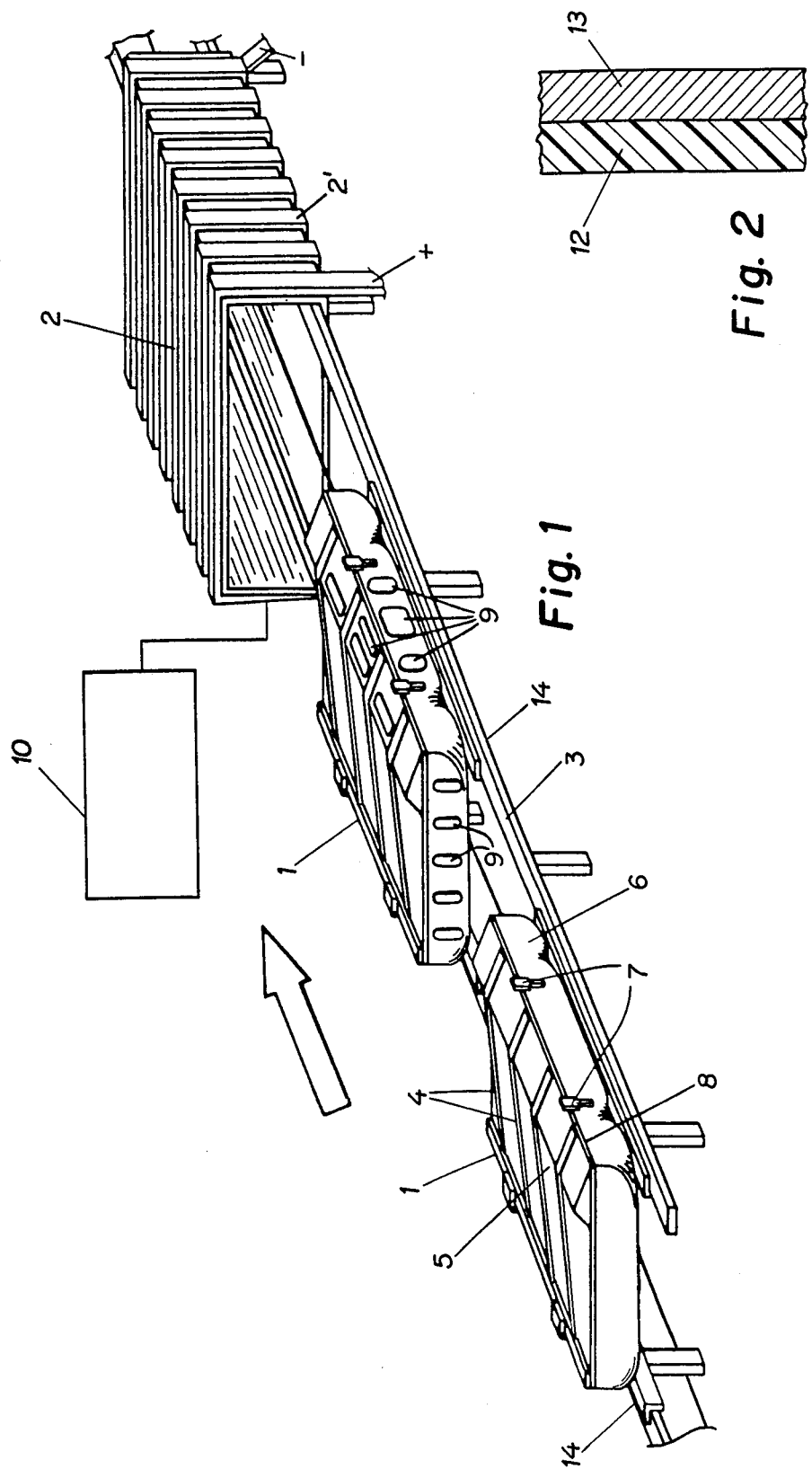
FIG. 1 is a perspective view of a device for the production of shaped, molded bodies in accordance with present invention.
FIG. 2 is a sectional view of a section of the walls of the mold.

FIG. 1 shows an inductor 2 consisting of a supporting box around which inductor coils 2' supplied with medium frequency are wound and connected to a generator 10 for generating the required electric alternating field. The inductor 2 is preferably of rectangular cross section and its length is adapted to the length of the mold or exceeds this length, so that adequate induction and heating takes place at the front and rear ends of a mold 1. On principle, the inner shape of the inductor does not matter. Its capacity is determined by the mold material and the desired temperature of the mold and the capacity can be specifically controlled for each individual mold by means of an appropriate control means.

Transport or conveying means such as rails 3 on which the molds 1 can be moved into and through the inductor 2 in cycles or continuously lead into the inductor. It is convenient to provide transport carts or rails of materials which are not heatable and cannot be influenced by the induction field.

FIGS. 1 and 2 show a mold 1 which is box-shaped in the instant case and consists of a bottom part 6 and a lid part 5, which box in its shape corresponds to an automobile seat. Around the mold 1, reinforcements parts 4 or reinforcing frames enforcing and/or holding the lid part 5 and bottom part 6 together are arranged. Reinforcement components on various mold parts, in particular reinforcing parts on the lid part 5, can be held together with the reinforcing parts on the bottom part 6 by means of locking or connecting means. Locking means 7 are provided for interconnecting or locking lid part 5 and bottom part 6. It is also possible to use auxiliary frames or the like into which the mold 1 is e.g. clamped, instead of the reinforcing parts 4. The lid part 5 is separable from the bottom part 6 along the line or the area 8 and electrically insulated at the same time. The electric insulation 11 may comprise epoxy resin or other plastic materials or any given electrically insulating materials of adequate strength and temperature stability, completely insulates the lid part 5 from the bottom part 6 electrically and at the same time seals the mold 1. The locking or closing means 7 and reinforcement parts 4 are constructed in a similar manner, so that they prevent a current flow from the upper lid part 5 to the lower lid part 6 and the formation of electrically conductive rings around the mold 1. For this purpose, suitable sectioning insulations are also provided between the locking means 7 or the individual connecting means or the reinforcing parts 4 or the locking means 7, the reinforcing parts 4 and the connecting means, such as the hinges, consist of electrically insulating material.

The molds used in actual practice are of markedly irregular outer shape because they are adapted to the desired shape of the shaped body, for instance, the molds have the most diverse forms of seat upholsteries for automobiles, arm rests and the like.

The means 11 mutually electrically insulating the lid part and bottom part can be hardening sealing masses or prefabricated insertable sealing or insulating elements. These do not offer preferred circulating paths around the mold for the current flow induced in the mold and prevent an undefined heating due to circulating short circuit currents. This also applies to the auxiliary frames 10 and to mutually connected reinforcing parts 4 arranged on separate mold parts.

In principle, a circulating ring can be prevented by inserting an electrical sectioning insulation or providing a slot or gap in such a manner that no annular currents can flow. For this, the short or small lateral faces and the front face of the mold shown in the drawing could each be formed of two parts and mutually electrically insulated, while the back wall could be made of one piece or of two mold parts conductively connected to one another (e.g. by means of a hinge) or not mutually insulated. The electrically conductive faces thus have a cross section through the mold approximately in the form of a C which suffices for preventing undesired annular currents. If the hinges or locking means on the other walls of the mold are electrically insulated, those on the back wall of the mold could be electrically conductive.

In practice, however, it is preferred to provide a mutual electrical insulation 11 of the mold over the entire circumference of the two or all matching mold parts. If the mold consists of more than two parts, these are appropriately mutually electrically insulated on the adjacent edges so as to prevent undesired annular currents.

It is further essential to provide for a local control or adjustment of the temperature of the wall of the mold by changes in thickness of the mold walls. Thicker walls heat up more slowly, if the heat can be well dissipated, the penetration depth of the electric field is less in relation to the wall thickness.

To this end, materials of good electricity or heat conducting properties such as metals like Cu, Fe or alloys can be attached to the metallic walls of the mold and also function as electric bridges between zones of high and low eddy current density and effect an additional heating or balancing between high and low temperatures. These materials or applications can consist of electrically better or worse conducting materials and/or better or worse heat-conducting materials as compared to the material of the preferably metallic and in particular steel walls of the mold. These local applications of foreign materials for instance in the form of metals, alloys or the like cause the mold walls to heat up slower or faster than the basic material of the mold walls in these locations and make the temperature of the irregularly formed mold uniform over its surface.

The figure shows plates 9 attached to the mold 1, which plates can have various shapes and dimensions and can be attached, for instance welded, in various spots of the mold walls, such as on the lateral walls and/or on the lid part 5 and/or on the bottom part 6; instead of these or in addition thereto, the mold walls can be provided with integral thickenings whose effect corresponds to that of the plates 9 in the walls (i.e. the lateral walls and/or the bottom and/or the lid).

By an appropriate selection of the material of the mold walls and in particular of the plates 9 and of the location on the walls or also by means of weaking of the mold walls or replacement of the material of the mold walls by another material or construction of the mold of different materials, the permeability and/or electrical conductivity and/or thermal conductivity of the mold walls can be influenced so that a uniform temperature in the mold walls can be obtained.

The molds 1 are shown with auxiliary supports 14 consisting of a material that is not inductively influenced and thus unheatable at the frequency used. The portions of the support 14 that are associated with or attached to the individual mold parts are mutually electrically insulated.

The mold walls can also be made up of several layers, for instance one layer of plastic material 12 which is lined with an inductively heated metal layer 13 on the inside as shown in FIG. 3. Care must be taken to calculate the penetration depth of the field so that it penetrates into the inductively heatable layer.

It is possible to see to it that only the mold walls and not the plastic material or the components to be reacted are heated inductively by keeping the penetration depth of the induced electric field smaller than the thickness of the wall. It is preferred to regulate the penetration depth in such a manner that only the, in particular metallic, mold wall or the inductively heatable layer(s) in the mold wall and the amount of heat required for a desired surface quality or forming temperature is supplied by the mold wall to the outer layer or surface of the shaped body.

The penetration depth of the electric or magnetic field into the inductively heatable mold walls or their inductively heatable layers only slightly exceeds the thickness of the walls, or preferably corresponds to their thickness or is less than their thickness. Preferably, the penetration depth is approximately one tenth to one half, in particular one fifth to one third, of the thickness of the mold walls or layers.

The inner cross section of the inductor is preferably rectangular, but it can also be oval or cylindrical or adapted to specific shapes of the molds.

The process according to the invention and the device according to the invention are also applicable if the molds for forming the shaped body are rotated in the inductor, for instance for forming objects in the inductively heated molds in the spin casting process of appropriate plastic materials.

The process and the device are also suitable for fiber mats such as glass fiber mats cast or sprayed with plastic materials such as polyurethane foams which are to be dried, pressed, reacted or hardened.

All features disclosed in the specification, the claims and the drawing can be combined in any given manner.

What is claimed is:

1. An apparatus for producing a molded body having a selected shape from a material to be molded, said apparatus comprising:
    induction heating means adapted to receive a mold and including means for generating an alternating magnetic field having a frequency of from 1 to 30 KHz; and
    an electrically conductive mold for imparting the selected shape to the material and heating a portion of the material to form the molded body, said mold being adapted for disposal within said induction heating means and including a lid member and a bottom container-like member, said members being adapted to inductively heat under the influence of the magnetic field, means on said members for distributing eddy current flow in the walls of said members to obtain a uniform temperature, electrical insulation disposed between said lid and said botton container members for limiting current flow in said mold to a flow of eddy currents in said members.

2. An apparatus as claimed in claim 1, wherein said means for distributing eddy current flow comprises ribs on the outside of said mold.

3. An apparatus as claimed in claim 1, wherein said members comprise metal.

4. An apparatus as claimed in claim 1, wherein said means for distributing eddy current flow comprises plates on the outside of said mold.

5. An apparatus as claimed in claim 4, further comprising a support for supporting said mold, said support being fabricated from a material which is not inductively heatable by said inductive heating means.

6. An apparatus as claimed in claim 1, wherein an outside wall of one of said members comprises layers of different metals.

7. An apparatus as claimed in claim 1, wherein an outside wall of at least one of said members comprises layers of a material which is not inductively heatable by said induction heating means and at least one layer of a material which is inductively heatable by said induction heating means.

8. An apparatus as claimed in claim 1, wherein said field generating means provides a field with a frequency range of from 5 KHz to 12 KHz.

9. An apparatus is claimed in claim 8, wherein said mold further comprises a plurality of hinges and locking means for holding together said lid member and said bottom container-like member, said hinges and said locking means being electrically insulated from said members.

10. An apparatus as claimed in claim 8, wherein said mold members are held together by locking means located on different mold members and said closing and locking means are electrically insulated from said members.

11. An apparatus as claimed in claim 8, wherein said means for distributing eddy current flow and at least one of said mold members are comprised of the same material.

12. An apparatus as claimed in claim 11, wherein the layers comprise metal and plastic.

13. A process for producing a molded body having a selected shape from a material to be molded, said process comprising the steps of:

introducing the material into an electrically conductive mold for imparting the selected shape to the material, said mold including a lid member and a bottom container member with said members being adapted to inductively heat under the influence of a magnetic field, means on said mold members for distributing eddy current flow to obtain a uniform temperature distribution in said members, and electrical insulation means disposed between said members for limiting current flow in said mold to a flow of eddy currents in said members;

introducing said mold into an electrical induction heating means including means for providing an alternating magnetic field having a frequency of from 1 to 30 KH about said mold to produce eddy currents in said members to inductively heat said members, said electrical insulation means limiting current flow in said mold to eddy currents;

permitting the material to react within said mold;

heating a portion of the material in contact with said inductively heated mold members.

14. A process as claimed in claim 13, wherein said means for distributing eddy current flow is disposed on outside walls of said mold members.

* * * * *